DISTRIBUTED AMPLIFIER WITH LOW NOISE

Original Filed June 2, 1954 3 Sheets-Sheet 1

INVENTORS
Ralph E. Sturm
Russell H. Morgan,
BY Shapiro and Shapiro
ATTORNEYS

INVENTORS
Ralph E. Sturm
Russell H. Morgan,
BY Shapiro and Shapiro
ATTORNEYS

DISTRIBUTED AMPLIFIER WITH LOW NOISE

Original Filed June 2, 1954 3 Sheets-Sheet 3

INVENTORS
Ralph E. Sturm
Russell H. Morgan,
BY Shapiro and Shapiro
ATTORNEYS

United States Patent Office 3,127,568
Patented Mar. 31, 1964

3,127,568

DISTRIBUTED AMPLIFIER WITH LOW NOISE

Ralph E. Sturm, Pikesville, and Russell H. Morgan, Baltimore, Md., assignors to The Bendix Corporation, a corporation of Delaware Original application June 2, 1954, Ser. No. 433,955, now Patent No. 2,899,494, dated Aug. 11, 1959. Divided and this application July 16, 1959, Ser. No. 827,511
12 Claims. (Cl. 330—54)

This invention relates to novel circuits, and more particularly to circuits which are useful in the translation of intelligence having a low signal-to-noise ratio, especially circuits employed for or in connection with the augmentation of a low level signal without emphasizing noise. An exemplary use of the invention is in the field of fluoroscopic screen intensification. This application is a division of Serial No. 433,955, filed June 2, 1954, in the names of the present applicants and entitled "System for the Translation of Intelligence at Low Signal-to-Noise Ratios," now Patent No. 2,899,494, issued August 11, 1959.

In the aforementioned parent application is described and claimed a system for translating low level signals in the presence of electrical noise of the same order of magnitude. As therein set forth, the system may comprise a closed link television chain intensifier having suitable camera, amplifier, kinescope, and auxiliary circuits. Prior television intensifiers were limited by their noise level, and use of the best components available failed to produce any significant improvement in the performance of the conventional television intensifier.

It was generally assumed in the prior art that the noise observed on the viewing screen of a conventional television system is the manifestation of random noise existing in nature, such as orthicon beam noise, shot effect, thermal agitation or resistor noise, etc., and that since such noise is inherent in the system, its effects can not be eliminated. Contrary to this generally accepted view, the applicants found that the noise present on the television screen is far in excess of that which would be predicted from classical noise theory, and moreover, that instead of being random, such noise has a definite spectral characteristic, which produces much greater deterioration of the picture than would be expected from theory. More specifically, it was discovered that the excessive noise present on the viewing screen is caused by shock excitation of underdamped modes of vibration of the circuitry by noise occurring in the input, which results in the augmentation in amplitude and compression into a narrow frequency band of the random noise existing in nature.

As explained in the aforementioned parent application, the applicants discovered that the solution to the problems set forth above, that is, the elimination of circuit oscillation in response to random noise excitation and the elimination of the accompanying amplitude accentuation and frequency compression of random noise, lies in the use of a system having circuits whose vibration modes within the entire operating range of frequencies are at least critically damped. The present application is directed to these circuits.

It is accordingly a principal object of the invention to provide novel circuits for translating intelligence having a low signal-to-noise ratio.

A further object of the invention is to provide novel amplifier circuits.

An additional object of the invention is to provide a novel scheme for introducing blanking signals into a television system or the like.

A still further object of the invention is to provide a novel cathode follower circuit or the like and method of operating the same.

The foregoing and other objects, features, and advantages of the invention and the manner in which the same are accomplished will become more apparent upon consideration of the following detailed description of the invention when taken in conjunction with the accompanying drawings which illustrate preferred and exemplary embodiments, and wherein.

Figure 1:
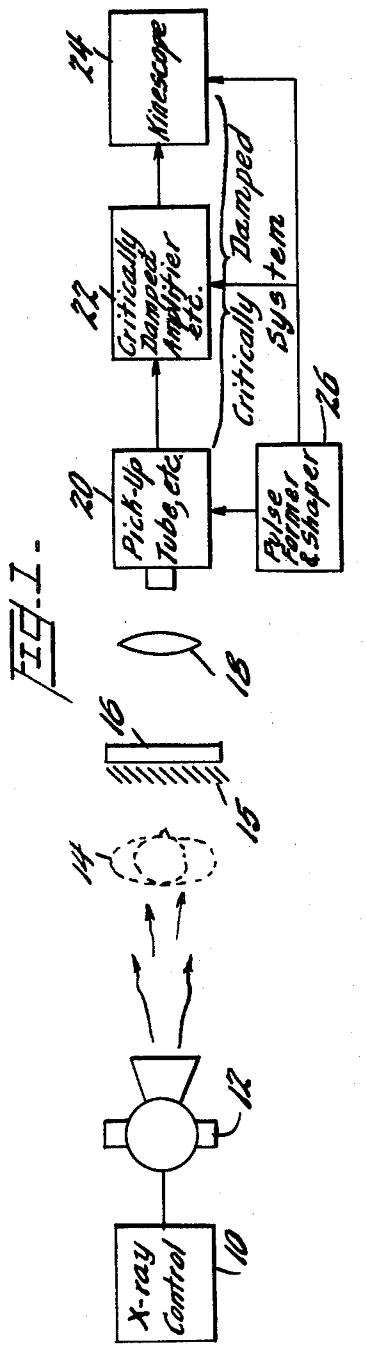
FIGURE 1 is a diagrammatic showing of the overall system of the parent application employed in a screen intensifier.

In FIGURE 1 the general scheme of the invention described in the parent application is shown. The invention of that application is illustrated as applied to an X-ray intensification system including an X-ray control 10 for controlling and operating an X-ray tube 12, which projects a beam of X-rays onto a fluorescent screen 16 through a subject 14. A grid 15 may be placed before fluorescent screen 16 to reduce scatter. The image produced on the fluorescent screeen 16 under the action of the X-rays is focused by an optical system represented by lens 18 onto the light sensitive element of a pick-up tube 20. This tube may be an image orthicon of the type conventionally employed in television practice. Block 20 may also include the necessary sweep circuits and controls for the image orthicon tube.

The electrical signals corresponding to the image produced on the light sensitive element of the pick-up tube are applied to a critically damped amplifier 22 which will be described in more detail hereinafter. Block 22 may include controls to set the contrast of the picture produced on the fluorescent screen of a kinescope 24, to which is applied the amplified signals from the critically damped amplifier 22. A pulse former and shaper 26 supplies the necessary pulses to initiate the operation of the sweep circuits associated with the image orthicon and the kinescope at precisely the same time so that the picture which is broken up into small increments by the image orthicon will be reassembled into exactly the same increments at a greater brightness by the kinescope 24. If desired, the screen of the kinescope 24 may be photographed to provide a permanent record of the observation. A suitable power supply (not shown) furnishes all of the power requirements for the intensifying unit. As set forth in the parent application it was discovered that the entire system through which the video signal passes must be at least critically damped if the accentuation of noise is to be eliminated.

In ordinary television practice, i.e., a 525 line interlaced scanning system, amplifiers must be capable of maintaining good amplitude and phase response over a frequency range of the order of 60 cycles per second up to approximately 4 megacycles per second. In a system such as that illustrated in FIGURE 1, the useful frequency range may be from about 50 cycles to 15 megacycles per second. It is well known that ordinary amplifier tubes in resistance-capacitance coupling will not cover the frequency range required in conventional television practice while producing optimum gain without the inclusion of special peaking circuits which compensate for the input capacitance of the tubes as well as the capacitance associated with the layout, wiring, and the components. Both shunt and series peaking as well as a combination of the two are employed. Peaking is usually accomplished by adding the required amount of inductance to correct for amplitude and phase angle distortion. In general, peaking renders the circuit oscillatory in one or more modes of vibration, and overshoot and subsequent oscillation occur because of the oscillatory condition. In order to correct for phase and amplitude distortion without employing an excessive number of tubes, which in turn would increase the noise of the system, it is necessary that the conventional circuits be oscillatory. If the standard peaked amplifier circuit were modified so that the gain of each stage were low enough to prevent oscillation, many additional stages would be required to produce the necessary over-all gain, and ultimately the noise introduced by the input tubes and their parameters would defeat the purpose.

The critically damped amplifier which forms a part of the present invention utilizes the long line or distributed constant principle. This general principle of amplifier design is, of course, not new to the art, since at the higher frequencies where the ordinary shunt or series peaking is not effective in correcting phase and amplitude distortion, amplifiers built on the theory that each tube is a part of the distributed capacitance of a long line have been employed to obtain wide band-width and high gain. Such amplifiers operate satisfactorily up to frequencies of several hundred megacycles when not limited by circuit effects outside the tubes. However, no reference is found in the prior art to the adaptation of a line amplifier to prevent the emphasis of noise in the translation of intelligence having a very low signal-to-noise ratio. In fact the large number of tubes required by such an amplifier would lead one to believe that line amplifiers are unsuitable for such use, because of the increased noise which would be expected from the employment of so many tubes.

Figure 2:
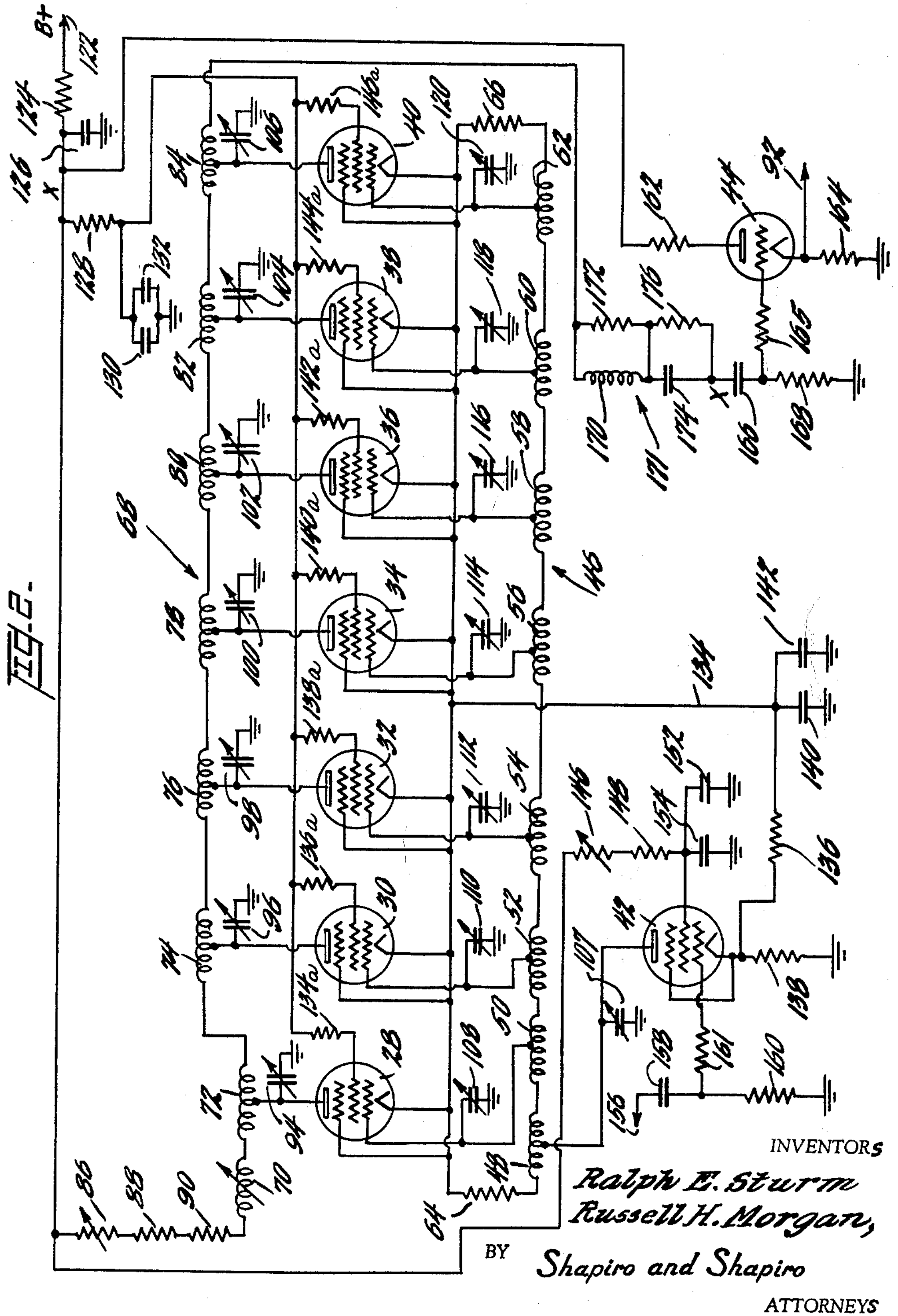
FIGURE 2 is a circuit diagram of one section of an amplifier constructed according to the invention.
Figure 6:
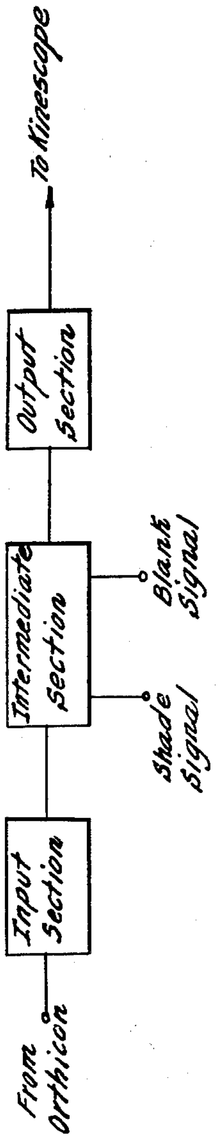
FIGURE 6 is a block diagram showing a preferred arrangement of the amplifier sections of the invention.

FIGURE 2 illustrates one section of the amplifier of the invention. Actually the complete amplifier may comprise several sections similar to that illustrated, each section connected to the previous one in cascade, as shown in FIGURE 6. Each section comprises a plurality of driving devices exemplified by the tubes 28 to 40. In this particular embodiment, seven pentodes, such as the 6CB6, are employed. The control grids of the respective tubes are connected to a grid line 46 comprising a series of coils 48 to 62 and condensers 108 to 120. Successive coils may be wound in opposition to reduce the mutual coupling between adjacent coils to the lowest level possible, but this is not essential. The grid line is terminated at its respective ends in its surge impedance by resistors 64, 66, respectively, and the small padding condensers 108 to 120 are employed to correct for variations in tube capacitances and to bring the surge impedance of each section of the line to the correct value. By proper adjustment the grid line may be made substantially reflectionless.

The anodes of the respective tubes are connected to a plate line 68 comprising coils 70 to 84, which also may be wound successively in opposition. Here again padding condensers 94 to 106 are employed to adjust the respective sections of the line to the correct surge impedance. The plate line may be terminated at one end by a plurality of resistors 86, 88, 90. The other end need not be terminated in its characteristic impedance, and this arrangement substantially doubles the gain, as is known in the art. As will become more evident hereinafter, reflections produced by failure to terminate one end of the plate line in its surge impedance will not greatly affect the operation of the circuit where pentodes are employed, because of the fact that beyond a certain voltage the plate voltage of a pentode does not substantially determine its plate current. The terminating resistors 86, 88, 90 on the plate line may be quite critical, since in this application they are required to have about 13 watts dissipation with negligible inductance. Ordinary non-inductive resistors of the wire-wound type may not be satisfactory, but the type R33 non-inductive resistor produced by the Corning Glass Company, or its equivalent, may be employed satisfactorily.

An input driving device illustrated by pentode 42, which may be a 6AH6 tube, has its anode connected to inductance 48 of the grid line and its control grid connected to input terminal 156 through a coupling network including coupling condenser 158 and grid return resistor 160. A suitable cathode load resistor 138 is provided. It will be noted that resistor 138 in series with a resistor 136 form a cathode load for the line tubes 28 to 40. These resistors are connected to the respective cathodes of the line tubes through lead 134 and are by-passed to ground through condensers 140, 142. The flow of plate current of the line tubes through resistors 136, 138 produces a small positive feed back which results in better low frequency response. The feed back is operative only at the extremely low frequencies, since the higher frequency signals are shunted by condensers 140, 142. Control over the feed back is accordingly obtained by selection of the values of condensers 140, 142. Cathode load resistor 138 may be shunted by a small condenser (not shown) to provide high frequency peaking and phase shift, if desired.

The passage of the line tube plate currents through resistors 136, 138 is also utilized to provide well regulated voltages for the grid line 46 and to decouple the grid line from the power supply. In operation, each line tube may have approximately 12 milliamperes flowing through it, and seven line tubes will give a total current of approximately 84 milliamperes. The resistance of resistor 136 may be approximately a thousand ohms, and the resistance of resistor 138 may have a relatively low value. The combined line tube plate currents passing through these resistors in series produces a regulated potential of approximately 84 volts at the cathodes of the line tubes, and this potential is applied to the plate of input tube 42 through terminating resistors 64, 66. Condensers 140, 142 also provide a filter for the input tube plate potential.

The screen grid of tube 42 is fed from the B supply at terminal 122 through variable resistor 146 and fixed resistor 148, and is by-passed to ground by condensers 152, 154. Resistor 146 may be employed to control the plate current of tube 42. Since the D.C. plate current of the input tube flows through resistors 64, 66, which lie in the control grid to cathode path of tubes 28 to 40, resistor 146 may also be employed to control the grid bias on tubes 28 to 40.

An output translating device, which has been illustrated as a triode tube 44 connected as a cathode follower, is coupled to that end of the plate line which is not terminated in its characteristic impedance, by a phase corrective network 171, which may comprise variable inductance 170, capacitor 174 and resistances 172, 176. A coupling condenser 166, a grid return resistor 168, and a cathode load resistor 164 are provided for the output tube. The output terminal 92 is connected to the cathode of the tube.

The B supply voltage fed to each of the amplifier tubes from terminal 122 should be very carefully regulated. Since shock excitation as well as standing waves at high frequencies may occur on the lead wires from the B supply, a decoupling network consisting of a resistor 124 and condenser 126 is inserted to decouple the amplifier from the power supply and to prevent these effects. The value of resistor 124 is made large enough so that the inductance of the line feeding the amplifier together with the distributed capacitance will not oscillate when shock excited.

The screen grids of tubes 28 to 40 are fed from the B supply through dropping resistor 128 and condensers 130, 132, which form a filter network. A plurality of resistors 134*a* through 146*a* is inserted in series which the respective screen grids of the line tubes. These resistors are employed to prevent spurious oscillations due to the inductance and capacitance of the lines feeding the screen grids of the particular tubes, that is, they are employed to ensure at least critical damping. In practice, it may be necessary to insert small resistors (such as resistors 161, 162, 165 associated with tubes 42, 44) in series with the grids and plates of all tubes except the line tubes per se to counteract any tendency toward oscillation of the inductance of the leads taken in conjunction with the distributed and tube capacitances. In this connection it should be noted that for optimum results it may, in some instances, be necessary to insert small resistors in the filament leads of the tubes and in the lines between the amplifier sections. Damping resistors are inserted wherever an oscillatory condition of inductance and capacitance would exist in their absence. These resistors may be of some convenient value, such as of the order of 47 ohms.

Where large condensers, such as electrolytics, are required in the circuit illustrated, they must be shunted by smaller condensers in order to ensure the desired high frequency response. It is well known that an electrolytic capacitor, for instance one having a capacitance of a hundred microfarads, is not satisfactory for use at high frequencies. To overcome this each of the large condensers is shunted with a smaller condenser, such as a .01 microfarad. Thus in FIGURE 2 condensers 130, 140 and 154, which may be large electrolytic capacitors, are shunted by smaller condensers 132, 142 and 152, respectively.

Considering the operation of the circuit illustrated in FIGURE 2, a low level signal at input terminal 156 is applied to the control grid of input tube 42 through the coupling network 158, 160. For purposes of illustration it is assumed that the input signal is a square wave with positive polarity. This wave will increase the current in the input tube, which will, by means of resistors 64, 66, produce a decrease in the voltage at the plate of tube 42. For extremely low frequencies, the inductances 48 through 62 have practically no effect, and resistors 64, 66, are essentially in parallel. However, at high frequencies, these inductances do have substantial effects, and consequently, it can be seen that the input signal produces a negative square wave which proceeds down the grid line 46 toward resistors 64, 66. It is evident from line theory that a line has a finite propagation time depending upon its parameters, that is, it takes a finite length of time for a voltage wave to move down the line. The propagation time may be controlled by the parameters R, C and L including parallel conductances (not shown) in each section of the line. The padding condensers 108 through 120 may be adjusted to compensate for varying input capacitance of the tubes so that the propagation constant is the same for each section of the line. The propagation constant of the line as a whole will, therefore, be linear, and the negative signal at the input of the line will move smoothy and linearly toward resistors 64, 66. A wave which is incident upon either of resistors 64, 66 will be completely absorbed, since the line is terminated at each end in its surge impedance.

In the plate line 68 the padding condensers 94 through 106 may similarly be adjusted to ensure a linear propagation constant for the plate line as a whole. While the termination comprising resistors 86, 88, 90 of the plate line may have a different value from the terminating resistors of the grid line, the propagation constants for the two lines may nevertheless be made exactly the same. Assuming this to be the case, when the negative square wave produced at the plate of input tube 42 reaches the control grid of tube 28, it produces in the plate circuit of this tube a positive pulse which is an amplified inversion of the pulse incident upon the control grid. Current through tube 28, as well as plate current for all of the other line tubes, must flow through the termination 86, 88, 90. Thus, the pulse produced at the plate of tube 28 will start down the plate line toward its ends. Since the propagation constants of the plate and grid lines are identical, as the negative pulse moves down the grid lines, the positive pulse will move down the plate line, and each time the negative pulse is incident on the grid of a line tube, the plate of such tube will add a positive pulse to the one already existing from the previous tube. The signal will be built up as though all seven tubes had been connected in parallel and all of their transconductances had been operating on the load resistance 86, 88, 90.

A grid line signal is completely absorbed in the terminating resistors 64, 66. However, in the plate line, since the far end is not terminated in its characteristic impedance the signal will be reflected depending on the type of termination. Consequently, a reflected signal will start back down the plate line passing each of the tubes in turn and finally arriving at the terminating resistance 86, 88, 90. Here the reflected signal will be completed absorbed, because the line at this point is terminated in its surge impedance. As indicated previously, the reflected signal will not affect the operation of the circuit, because the plate current of a pentode is substantially independent of its plate potential beyond a certain potential.

The useful signal on the plate line passes through the phase corrective network 171 and is applied to the control grid of cathode follower 44. The signal incident on the grid of the cathode follower produces a signal at the cathode which can be fed to the next amplifier section from a substantially low impedance source. This tube acts as an impedance changer and a decoupling tube, so that whatever is connected to the output of the amplifier section will not have a substantial effect on the characteristics of the plate line of this particular section.

Three sections identical to that illustrated in FIGURE 2, with the exception of special input and output connections to facilitate introduction of blanking signals, etc. may be connected in tandem as shown in FIG. 6, producing a maximum gain of from 400,000 to 1,000,000. Such an amplifier system has been tested in a closed link television chain of the type illustrated in FIGURE 1 employing a standard image orthicon tube of the 5820 type, and it has been found that with critical damping the noise is reduced by a factor of the order of 20 to 80 times over a system using a standard shunt-series peaked amplifier. Good pictures were obtained on the screen of the kinescope down to light levels of $10^{-4}$ millilamberts, and in particular it was observed at this level that the small amount of noise that remained was entirely random and did not interfere with the resolution of the picture nearly as much as did the previous periodic noise at the higher light levels.

The fact that the critically damped amplifier of the invention does not accentuate noise also implies, and it is proved in actual practice, that any signal, and in particular the square wave variety where the rise time is extremely fast, will be reproduced essentially faithfully without overshoot or ringing. In conventional amplifiers, such as the shunt and series peaked type, this is not the case. This means that much better resolution may be obtained through use of the invention.

Since the power distribution of random noise is equal in any given frequency interval of the spectrum, it is evidently desirable to limit the spectrum of the system in order to reduce the noise to the lowest possible value. This may be done by limiting both the top and bottom of the signal pass band of the system, preferably at its input. It can be shown that a system may be shock excited by a signal, such as a spurious oscillation, which is entirely outside the pass band of the system. It has been found that when one controls the phase and amplitude characteristics of the limits of the pass band so as to produce the narrowest pass band that is necessary to transmit the intelligence and at the same time to prevent oscillations, the lowest possible noise level is obtained.

The term "critically damped" as employed in the specification and claims describes the condition of a circuit in which the ability of the circuit to oscillate just ceases to exist. For example, in a simple series circuit having inductance L, capacitance C, and resistance R, critical damping exists when the solution to the differential equation for the current in the circuit is such that the discriminant is equal to zero, or where $$\frac{R^2}{L4^2}=\frac{1}{LC}$$

If the left-hand term of this equation is greater than the right-hand term, the circuit is "over-damped." In both instances the circuit is non-oscillatory, but if the left-hand term is smaller than the right-hand term, the circuit is oscillatory. As employed in the specification and claims the term "at least critically damped" refers to a circuit which is either critically damped or over-damped, i.e., non-oscillatory.

The ideal condition of exact critical damping is difficult to achieve, and in practice the condition is approached as a limit from the region of over-damping. The amplifier must be at least critically damped through its entire operating range, which includes its pass band and band skirts. Auxiliary circuits of the amplifier through which the signal does not pass but which may introduce spurious oscillations, such as power supply leads, leads for inserting blanking signals, etc., should of course be at least critically damped to prevent noise enhancement, but may be substantially over-damped without detracting from fidelity of reproduction.

The output of the final amplifier section may be required to drive a kinescope as indicated in FIGURE 1. Good design requires that the amplifier be able to drive the kinescope from cut-off to cut-off even though this may not actually be done in practice. For the type of kinescope employed in the illustrative system at least a 30 volt signal would be required to accomplish this. In driving the final cathode follower through a full 30 volts it was noted initially that the low frequencies were handled very well with little or no distortion; however, the higher frequency signals which were impressed on the input were notably distorted. When square waves with extremely short rise time were fed through the circuit, there was a noticeable curving off as the square portion of the curve rose, that is, high frequency cut-off or high frequency attenuation was noted. It had been assumed in the art that conventional cathode followers would handle signals up to frequencies at which transit time effects become important. It was found that the capacitance between the cathode and the filament of the cathode follower as well as the capacitance of the associated parts of the circuits delayed the rise time or fall time of the signal applied to the cathode so that it did not follow the grid instantaneously. Under ordinary conditions such a phase lag could be corrected in the circuit if that were the only effect. However, the lag of the cathode with respect to the grid causes the grid to draw current, upsetting all of the relationships in the circuit and consequently causing a badly deformed wave in the output. It was discovered that this effect may be overcome by arranging conditions so that the tube has a quiescent bias between cathode and grid which is always equal to or larger than the signal applied to the grid.

Figure 4:
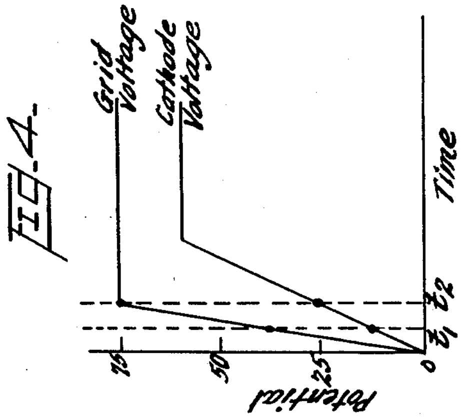
FIGURE 4 is a graphic illustration of the operation of a conventional cathode follower under conditions to be described hereinafter.

FIGURE 4 illustrates the phenomenon discussed above. It can be seen that when a square wave is applied to the grid of the cathode follower, the cathode voltage does not rise at the same rate and at time $t_1$, for example, the grid may be positive relative to the cathode by better than 25 volts. The conditions at time $t_2$ indicate that the maximum positive grid-cathode voltage may reach 50 volts in the example given. The result is a badly distorted output signal. The quiescent grid-cathode voltage must, therefore, be chosen so that the grid is at least 50 volts negative with respect to the cathode in order to eliminate the phenomenon discussed. This may be accomplished by choosing the tube, plate voltage and cathode load, so that the quiescent current through the cathode load is sufficient to bias the cathode at least 50 volts positive with respect to the grid, for the example given. The graph makes use of linear curves for simplicity, but in practice these curves are exponential.

Figure 3:
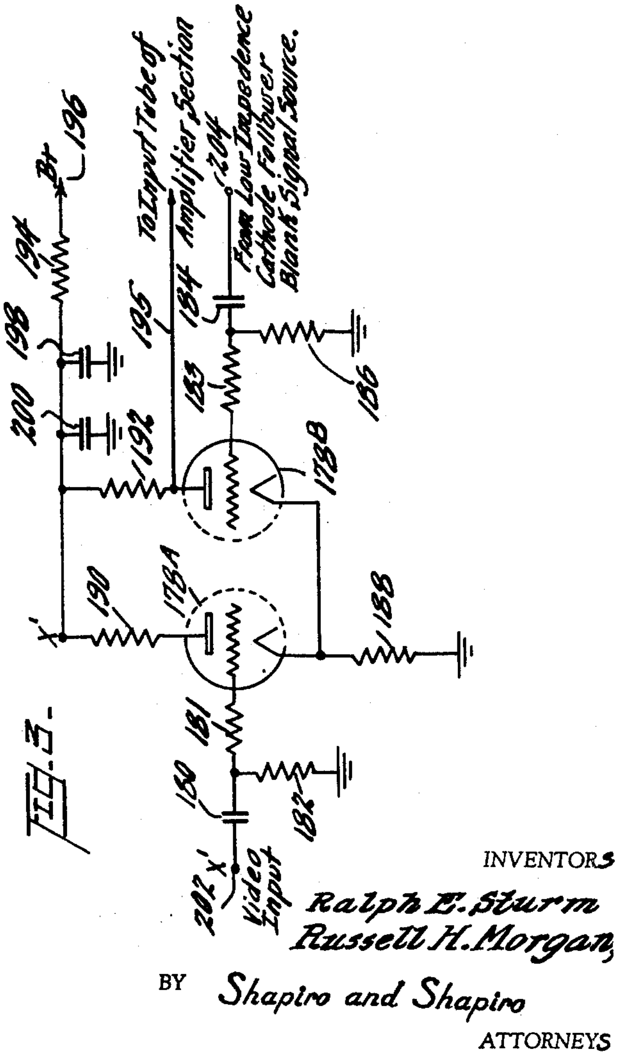
FIGURE 3 is a circuit diagram of a device of the invention for introducing blanking signals into the intensifier.

In the three-section amplifier of FIG. 6, each section is direct-coupled, but from section to section resistance-capacitance coupling is employed. This allows the convenient introduction of blanking and shading signals, which are preferably not applied directly to the line tube stages. FIGURE 3 illustrates a unique way of introducing the blanking signal. This signal is generally employed to cut off the beam of the kinescope during the return trace of the cathode ray so that the latter does not interfere with the picture, and in the particular system disclosed it is also utilized to set the D.C. black level in association with the circuits that follow so that contrast control is obtained in the final picture. In the circuit of FIGURE 3 the video input signal at terminal 202 is applied through a network comprising coupling condenser 180 and grid return resistor 182 to the control grid of a triode 178A. The blank signal, which may be fed from a low impedance cathode follower source, is applied from terminal 204 to the control grid of a triode 178B through a coupling network comprising condenser 184 and grid return resistor 186. As indicated in the drawing, tubes 178A and 178B may be constituted by two sections of a dual triode tube. The triodes are provided with a common cathode resistor 188 and are connected to a source of B supply 196 through a decoupling network comprising resistor 194 and condensers 198, 200. The latter condenser is of relatively small value and shunts the larger condenser 198 (which may be electrolytic) for the higher frequencies, in the manner set forth previously. Resistor 192 is a plate dropping or load resistor for tube 178B, while resistors 181, 183, 190 are small resistors employed to eliminate parasitic oscillations and to ensure critical damping. The video input signal on the control grid of tube 178A is coupled from the cathode of the latter to the cathode of tube 178B. So far as the signal applied to the cathode of tube 178B is concerned, this tube operates as a grounded grid amplifier, which allows operation at a higher frequency, because the input capacitance is quite low. The control grid of tube 178B serves as a mixer grid to which the blank signal is fed, and the output is taken on lead 195 from the plate of this tube. The dual triode 178AB may constitute the output tube corresponding to tube 44 of FIG. 2 for the intermediate amplifier section of FIG. 6. This substitution is indicated in the drawings and may be accomplished by breaking the circuit of FIG. 2 at points X and connecting in place of tube 44, etc., the circuit of FIG. 3 at the points $X^1$. This arrangement operates well up to and including frequencies of 15 megacycles, giving an appreciable gain, depending on the transconductance of the tubes, without employing peaking devices. Thus, an amplifying stage is provided which may be used together with the line amplifier to obtain additional gain and to solve the problem of mixing without introducing any deleterious effects on the signal, as would occur with a stage in which peaking were employed in order to properly correct for amplitude and phase distortion. The use of a dual triode allows extremely short cathode leads and, therefore, minimizes cathode inductance. If separate tubes were employed, the parameters of the cathode circuits could be adjusted to produce a filtering action, if desired.

Figure 5:
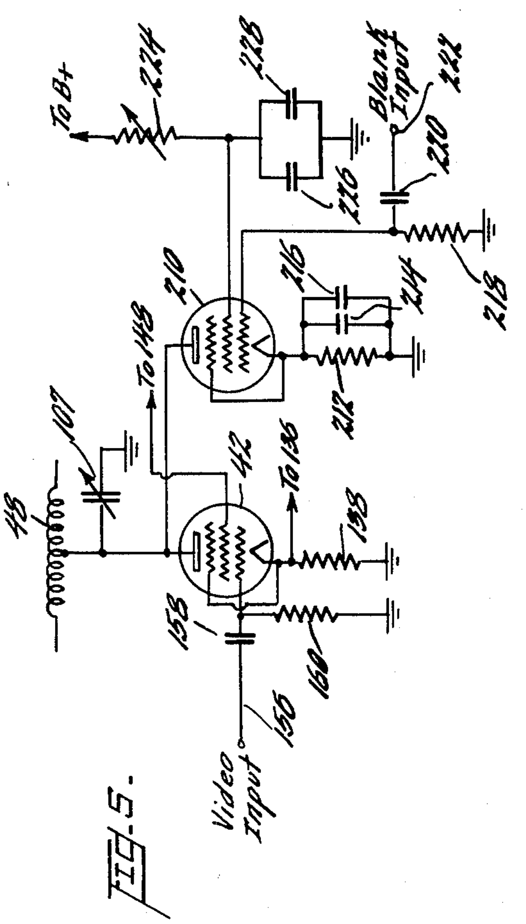
FIGURE 5 is a circuit diagram of a modified device of the invention for introducing blanking signals.

Alternatively, blank signals could be introduced by employing a second pentode in parallel with the input tube 42 in FIGURE 2, connecting the plates of the tubes together and utilizing separate screen grid, cathode and control grid connections. This arrangement is illustrated in FIG. 5, wherein tube 42 and associated components correspond to those shown in FIG. 2; only that portion of FIG. 2 necessary to the description is repeated. The anode of parallel tube 210 is connected to the anode of tube 42, and the cathode is connected to ground through a bias network including resistor 212 and condensers 214, 216. The screen grid of tube 210 is fed from the B supply through a variable dropping resistor 224 and bypass condensers 226, 228. Condensers 216 and 228 may be employed to shunt larger condensers 214, 226, as set forth previously. The blank signal from terminal 222 is coupled to the control grid of tube 210 through resistor-condenser network 218, 220. In operation, the bias of tube 210 is adjusted so as to prevent large shunting of tube 42, thereby preventing substantial loss in gain for tube 42. It has been found that satisfactory operation results if tube 42 carries 80% of the combined plate current, provided the blank signals are sufficiently strong. While this arrangement makes an excellent mixing system, there is some loss of the normal gain of tube 42.

The introduction of a shade signal, indicated in FIG. 6, may be conveniently accomplished by applying the required saw tooth voltage to the cathode and/or the control grid of the input tube (corresponding to tube 42 in FIG. 2) of the intermediate amplifier section. The need for such signals is well known in television practice, and systems for applying such signals are also well known. Contrast control may be achieved by inserting a gain control potentiometer in the input to the intermediate amplifier and a suitable black level setter in the output of the output amplifier section.

While a preferred embodiment of the invention has been shown and described, it will be apparent to those skilled in the art that changes can be made in this embodiment without departing from the principles and spirit of the invention, the scope of which is defined in the appended claims. For example, the principles of the invention may be applied to transistor circuits as well as vacuum tube circuits, and the term "tube" as used herein is intended to be generic to any type of electron driving device employed in accordance with the invention. Accordingly, the foregoing embodiment is to be considered illustrative, rather than restrictive of the invention, and those modifications which come within the meaning and range of equivalency of the claims are to be included therein.

The invention claimed is:

1. A line amplifier comprising an anode transmission line, a grid transmission line, a plurality of line tubes having anodes connected in sequence to said anode line and control grids connected in sequence to said grid line, a source of anode potential having one terminal connected to said anode line, terminating impedance means for said line tubes, an input tube having its anode connected to one end of said grid line and having a cathode load connected between its cathode and another terminal of said source, means connecting the cathodes of said line tubes to the cathode of said input tube and through said cathode load to said other terminal, the anode supply path for said input tube including said grid line terminating means and said line tubes, said means connecting the cathodes of the line tubes to the cathode of the input tube comprising a low pass filter, and said cathode load for the input tube constituting a cathode load for said line tubes.

2. The amplifier of claim 1, including means for manually adjusting the output current of said input tube, whereby the grid bias of said lines tubes may be adjusted.

3. The amplifier of claim 1, said input tube having a screen grid connected to an adjustable source of potential.

4. The amplifier of claim 1, said input tube having another tube connected in parallel therewith, said other tube having a control element adapted for connection to a source of blanking signals.

5. The amplifier of claim 4, said other tube having a screen grid connected to a source of adjustable potential.

6. A line amplifier comprising an anode transmission line, a grid transmission line, a plurality of line tubes having anodes connected in sequence to said anode line and control grids connected in sequence to said grid line, a source of anode potential having one terminal connected to said anode line, terminating impedance means for said grid line connecting said grid line to the cathodes of said line tubes, an input tube having an anode connected to one end of said grid line and having a cathode load connected between its cathode and another terminal of said source, means connecting the cathodes of said line tubes to the cathode of said input tube and through said cathode load to said other terminal, an output cathode follower connected to said anode line, said line tubes having screen grids connected to said source of anode potential through damping resistors, said input tube having a control grid connected to an input terminal through a damping resistor, and said cathode follower comprising a tube having an anode connected to said source of anode potential through a damping resistor and having a control grid connected to said anode line through a damping resistor, the entire amplifier being at least critically damped.

7. A line amplifier comprising an anode transmission line, a grid transmission line, a plurality of line tubes having anodes connected in sequence to said anode line and control grids connected in sequence to said grid line, a source of anode potential connected to said anode line, terminating impedance means connecting the grid line to the cathodes of said line tubes, and a cathode follower including a tube with a grid connected to said anode line through a phase-correcting network.

8. The amplifier of claim 7, further comprising an additional tube with its cathode connected to the cathode of the cathode follower tube and its anode connected to a source of anode potential through an anode load, said additional tube having a grid adapted to be connected to a low impedance source of blanking signals.

9. The amplifier of claim 8, said cathode follower tube having damping resistors in series with its control grid and its anode, and said additional tube having a damping resistor in series with its grid, the entire amplifier being at least critically damped.

10. The amplifier of claim 8, said additional tube having an output connection from its anode.

11. The amplifier of claim 7, said cathode follower having means for applying a positive bias to its cathode at least as large as the maximum positive amplitude of the signals applied to its grid.

12. A line amplifier comprising an anode transmission line, a grid transmission line, a plurality of line tubes each having an anode, a cathode, a control grid, and a screen grid, said anodes being connected in sequence to said anode line and said control grids being connected in sesequence to said grid line, said grid line having means at each end thereof for terminating said grid line in its characteristic impedance, said cathodes being connected to each end of said grid line through said impedance means, said anode line having means at one end thereof for terminating said anode line in its characteristic impedance, a source of B+ potential, means including a damping resistance for connecting said source to said one end of said anode line through its terminating impedance means, means including a plurality of damping resistances for connecting the respective screen grids to said source, an input tube having a control grid, a cathode and an anode, an input terminal, means including a damping resistance for connecting said input terminal to said control grid of said input tube, means connecting the anode of said input tube to one end of said grid line, means connecting the cathode of said input tube and the cathodes of said line tubes to a point of reference potential, an output tube having a control grid, a cathode, and an anode, means including a damping resistance for connecting the other end of said anode line to the control grid of said output tube, means including a damping resistance for connecting the anode of said output tube to said source, and means for connecting the cathode of said output tube to said point, said amplifier, including each of said connecting means, being at least critically damped for all vibration modes within the entire operating range of frequencies.

References Cited in the file of this patent

UNITED STATES PATENTS

| | | |
|---|---|---|
| 2,070,900 | Harris | Feb. 16, 1937 |
| 2,200,055 | Burnett | May 7, 1940 |
| 2,205,738 | Wheeler | June 25, 1940 |
| 2,488,357 | Webster | Nov. 15, 1949 |
| 2,593,948 | Wiegand et al. | Apr. 22, 1952 |
| 2,662,938 | Goldstine | Dec. 15, 1953 |
| 2,670,408 | Kelley | Feb. 23, 1954 |
| 2,721,908 | Moe | Oct. 25, 1955 |
| 2,778,887 | Bradley | Jan. 22, 1957 |
| 2,846,522 | Brown | Aug. 5, 1958 |
| 2,863,006 | Diambra et al. | Dec. 2, 1958 |
| 2,863,007 | Fischer | Dec. 2, 1958 |
| 2,892,043 | Doshey | June 23, 1959 |

FOREIGN PATENTS

| | | |
|---|---|---|
| 448,113 | Great Britain | June 2, 1936 |

OTHER REFERENCES

Scharfman article, "Distributed Amplifier Covers 10 to 360 Mc.," Electronics, vol. 25, issue 7, July 1952, pp. 113–115, 121–123.

Tuller article, "Distributed Amplifiers," IRE Convention Records, 1953, Part 5, Circuit Theory.

UNITED STATES PATENT OFFICE

CERTIFICATE OF CORRECTION

Patent No. 3,127,568 March 31, 1964

Ralph E. Sturm et al.

It is hereby certified that error appears in the above numbered patent requiring correction and that the said Letters Patent should read as corrected below.

Column 7, lines 9 to 11, the equation should appear as shown below instead of as in the patent:

$$\frac{R^2}{4L^2} = \frac{1}{LC}$$

column 9, line 50, after "for said" insert -- grid line connecting said grid line to the cathodes of said --.

Signed and sealed this 28th day of July 1964.

(SEAL)

Attest:

ESTON G. JOHNSON
Attesting Officer

EDWARD J. BRENNER
Commissioner of Patents